(12) United States Patent
Suart et al.

(10) Patent No.: US 11,057,517 B2
(45) Date of Patent: Jul. 6, 2021

(54) METHOD FOR MANAGING A FAILURE TO ESTABLISH A COMMUNICATION BETWEEN A FIRST AND A SECOND TERMINAL

(71) Applicant: ORANGE, Issy-les-Moulineaux (FR)

(72) Inventors: Christophe Suart, Chatillon (FR); Yann Gestraud, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/651,651

(22) PCT Filed: Sep. 24, 2018

(86) PCT No.: PCT/FR2018/052332
§ 371 (c)(1),
(2) Date: Mar. 27, 2020

(87) PCT Pub. No.: WO2019/063920
PCT Pub. Date: Apr. 4, 2019

(65) Prior Publication Data
US 2020/0314237 A1 Oct. 1, 2020

(30) Foreign Application Priority Data
Sep. 29, 2017 (FR) ...................................... 1759044

(51) Int. Cl.
*H04M 3/42* (2006.01)
*H04M 3/436* (2006.01)
(Continued)

(52) U.S. Cl.
CPC ... *H04M 3/42365* (2013.01); *H04M 3/42195* (2013.01); *H04M 3/436* (2013.01);
(Continued)

(58) Field of Classification Search
CPC ......... H04M 3/42365; H04M 3/42195; H04M 3/436; H04M 3/48; H04M 7/0045; H04M 2203/651
(Continued)

(56) References Cited

U.S. PATENT DOCUMENTS 7,373,428 B1 * 5/2008 Armstrong .............. H04L 67/22
370/349
2006/0227949 A1 10/2006 Shaffer et al.
(Continued)

OTHER PUBLICATIONS

International Search Report dated Dec. 13, 2018 for corresponding International Application No. PCT/FR2018/052332, filed Sep. 24, 2018.
(Continued)

*Primary Examiner* — Farid Seyedvosoghi
(74) *Attorney, Agent, or Firm* — David D. Brush; Westman, Champlin & Koehler, P.A.

(57) ABSTRACT

A method and device for managing a communication between a calling terminal and a called terminal in the event that it is impossible to reach a called terminal during an attempt to establish a communication according to a first mode. The method includes: receiving a message including an identifier associated with the called terminal and an indication according to which the communication cannot be established; obtaining, from identifiers associated with the calling terminal and the called terminal, a host card including at least one piece of information relating to the reachability of the user of the called terminal; transmitting, according to an instant messaging protocol, the obtained response message to the calling terminal, the host card being configured to allow the triggering of a communication according to a mode that is distinct from the first mode.

12 Claims, 4 Drawing Sheets

(51) Int. Cl.
*H04M 3/48* (2006.01)
*H04M 7/00* (2006.01)

(52) U.S. Cl.
CPC ........... *H04M 3/48* (2013.01); *H04M 7/0045* (2013.01); *H04M 2203/651* (2013.01)

(58) Field of Classification Search
USPC ........................................................ 455/414
See application file for complete search history.

(56) References Cited

U.S. PATENT DOCUMENTS

| | | | | |
|---|---|---|---|---|
| 2007/0104191 | A1* | 5/2007 | Jeon | H04W 28/18 370/389 |
| 2013/0311545 | A1* | 11/2013 | Wright | G06Q 10/10 709/202 |
| 2014/0118465 | A1* | 5/2014 | Scott | H04M 3/436 348/14.03 |
| 2015/0312409 | A1 | 10/2015 | Czarnecki et al. | |
| 2016/0127534 | A1 | 5/2016 | Celik et al. | |
| 2018/0152665 | A1* | 5/2018 | Zuo | H04L 51/10 |
| 2018/0227424 | A1* | 8/2018 | Dorsey | H04W 4/14 |

OTHER PUBLICATIONS

Written Opinion of the International Searching Authority dated Dec. 13, 2018 for corresponding International Application No. PCT/FR2018/052332, filed Sep. 24, 2018.
Campbell et al., "The Message Session Relay Protocol (MSRP)", Request for Comments: 4975, Memo, Sep. 2007.
"Rich Communication Suite 5.1 Advanced Communications Services and Client Specification", RCC.07, Version 2.0, GSM Association, May 3, 2013.
Handley et al., "SDP: Session Description Protocol", Request for Comments: 4566, Memo, Jul. 2006.
English translation of the Written Opinion of the International Searching Authority dated Dec. 21, 2018 for corresponding International Application No. PCT/FR2018/052332, filed Sep. 24, 2018.

* cited by examiner

METHOD FOR MANAGING A FAILURE TO ESTABLISH A COMMUNICATION BETWEEN A FIRST AND A SECOND TERMINAL

CROSS-REFERENCE TO RELATED APPLICATIONS

This Application is a Section 371 National Stage Application of International Application No. PCT/FR2018/052332, filed Sep. 24, 2018, which is incorporated by reference in its entirety and published as WO 2019/063920 A1 on Apr. 4, 2019, not in English.

FIELD OF INVENTION

The present invention belongs to the field of telecommunications, and in particular targets a method for automatic response in the event of failure of an attempt to establish communication.

PRIOR ART

Conventional voicemail systems allow a calling user to leave a voice message for the attention of a called user when said called user is not reachable. Upon receiving an error code in relation to the failure to establish a call, the communication is redirected to a voice server associated with the called party and designed to record a voice message. A customized announcement may be played in order to invite the caller to record a voice message that will be consulted later on.

The recipient of the message is generally notified when a message is left for him, for example by way of an SMS (Short Message Service). The recipient is able to consult his messages by establishing voice communication with the messaging server. The user of the messaging service is able to manage his messages by triggering actions by transmitting suitable DTMF (dual tone multi-frequency) codes. He is for example able to listen to a message, delete it or else ask to be put in contact with the correspondent who left the message.

The use of DTMFs to manage a voice server is not optimum from an ergonomic standpoint. Specifically, the user has to move the telephone handset away from his ear, enter the desired code on the keypad of the telephone, and then put the handset back against his ear. In order to overcome this drawback, some messaging services make it possible to manage messages based on voice commands that are interpreted by the messaging system.

Another development regarding access to voice messaging for the recipient of a message is visual voice messaging (VVM). Access to the messaging service then takes place directly from the terminal through a graphical interface, without it being necessary to establish voice communication. The received messages are displayed in the form of a list and associated with interaction elements allowing the user for example to listen to or delete messages in a non-linear manner or to call back a correspondent.

Access to the messaging service for the recipient of a message has thus been improved from both a technical and an ergonomic standpoint.

However, access to the service for the party leaving a message has not been subject to such developments, even though a few improvements have been able to be made for example with European patent application EP783219A2, which describes a method for customizing a welcome announcement depending on the number of the caller.

In particular, a user whose call is redirected to a messaging service has no other choice than to hang up or to leave a message, or to modify a recorded message based on DTMF commands.

There is therefore a need to technically and ergonomically improve the messaging service for the caller.

SUMMARY OF THE INVENTION

To this end, what is proposed is a method for managing communication between a calling terminal and a called terminal in the event that it is impossible to reach a called terminal in an attempt to establish communication using a first mode, the method comprising the following steps performed by a communication server:
  receiving a message comprising an identifier associated with the called terminal and an indication according to which the communication is not able to be established,
  obtaining a welcome card comprising at least one item of information relating to the reachability of the user of the called terminal based on the identifiers associated with the calling terminal and with the called terminal,
  transmitting the obtained welcome card to the calling terminal in accordance with an instant messaging protocol, the welcome card being configured so as to make it possible to trigger communication using a mode different from the first mode.

The caller is thus not put in contact with a voice server when the correspondent is not reachable. Instead, a message customized by the called party is transmitted to the calling terminal by way of a data connection, for example through an instant messaging protocol in accordance with the RCS standard.

The message is for example an instant message in accordance with the RCS standard, such as for example a "rich card". The user of the calling terminal thus immediately obtains indications regarding the reachability of the correspondent, such as for example alternative contact details. Based on this message, the user of the calling terminal may for example trigger instant messaging communication using another communication mode.

A communication mode within the meaning of the invention is characterized by the media or the communication protocols implemented in the communication, or else by the terminals between which the communication is established.

Such a method increases the chances of being able to reach a correspondent and improves the ergonomics of the service.

According to one particular embodiment, the message comprises an interaction element designed to trigger the recording of a voice message by the calling terminal and the sending of the recorded message by way of an instant messaging protocol.

The voice message is recorded locally on the terminal and then sent by way of instant messaging. It is no longer necessary for voice communication to be established beforehand with a voicemail system. The recording and the sending are performed locally on the terminal, and the ergonomics may be improved significantly.

Furthermore, it is no longer necessary to use a dedicated and centralized messaging server. The message is transmitted to the correspondent using the infrastructure and the file transfer services deployed in order to implement instant messaging. For example, the distribution of the voice message may be deferred via a "store and forward" service until the recipient user is available.

According to one particular embodiment, the method is such that the welcome card furthermore comprises at least one alternative communication identifier associated with the user of the called terminal.

The welcome card comprises one or more alternative addresses for reaching the correspondent. For example, this may be another telephone number, a SIP URI (Universal Resource Identifier), an email address or else an identifier on a social network. The user thereby does not need to know all of the contact details for reaching the correspondent.

According to one particular embodiment, the at least one alternative communication identifier is selected and inserted into the welcome card by the communication server according to reachability criteria of the called terminal.

The reachability criteria on the basis of which the second address is selected are for example schedule criteria, availability criteria obtained from a diary, or else location criteria.

In this way, the method offers the caller the option of contacting the correspondent in a manner suited to the context. For example, the welcome card may contain an indication according to which the correspondent is reachable at his workplace and provide the called party with a means for establishing communication with a work telephone of the called party.

As a variant, the contact details provided to reach the correspondent may be masked in the received welcome card so as to allow the caller to contact his correspondent without otherwise disclosing the correspondent's contact details. The confidentiality of a direct work line may thus be preserved.

According to one particular embodiment of the invention, the response message is furthermore generated from an address book associated with the called terminal.

Such a provision makes it possible to customize the welcome card on the basis of the caller. It is thus possible to provide different reachability information depending on whether the call identifier of the calling terminal is contained in an address book associated with the called terminal.

For example, a user may beforehand create various response messages to be transmitted when he is not reachable and associate these messages with various contacts in an address book, or various contact categories. Personal, professional or unknown contacts may thus receive different contact data.

According to one particular embodiment, the method is such that it furthermore comprises, when a welcome card has been obtained, a step of transmitting, in response to the message comprising an indication according to which the communication is not able to be established, a message designed to cancel the attempt to establish communication without redirection to voicemail.

Such a provision makes it possible to end the caller's call attempt in order to avoid the call being redirected to voicemail. Such a message may contain an identifier designed to identify the communication from among the communications established or currently being established in the telecommunication network through which the calling terminal is attempting to establish communication and an indication according to which the communication should be ended.

According to one particular embodiment, the welcome card is such that the information relating to the reachability of the called user is associated with at least one element selected from among the elements contained in the following list:
a schedule,
location data of the first terminal and/or of the second terminal,
a movement speed,
a presence status,
a validity criterion.

The chances of the caller being able to contact the correspondent are then increased.

Communicating a schedule associated with an identifier or a call mode allows the caller to make the call again at an opportune time so that the caller is able to accept the communication. For example, this may be the opening hours of a shop.

Associating a geographical location of the called terminal with reachability information, such as for example an alternative telephone number, allows a user of the calling terminal to select a suitable communication mode, such as for example to establish communication with a landline of the home of the called party when said called party is at home.

When a movement speed, or an indication according to which the called party is moving, is contained in the welcome card, the welcome card may temporarily mask a communication mode that is incompatible with the fact that the user is moving, for as long as the user of the called terminal is moving. For example, a mobile telephone number may be masked for as long as the user is moving at a certain speed.

The reachability information communicated in the welcome card may depend on a presence status configured by the user on an instant messaging system.

The reachability information may furthermore be made conditional on various validity criteria, such as for example a period during which the correspondent is able to be reached using a particular mode.

According to one particular embodiment, the method furthermore comprises a step of obtaining communication capabilities of the calling terminal, the welcome card being transmitted using a communication technology compatible with the calling terminal.

The welcome card is transmitted to the calling terminal only if a compatible transmission technology is supported thereby. If the calling terminal is not compatible, the call may be redirected to conventional voicemail.

According to another aspect, the invention relates to a method for reception of a welcome card by a calling terminal in the event that it is impossible to reach a called terminal using a first mode, the method comprising the following steps:
transmitting a message for establishing communication to the called terminal using the first mode,
receiving a welcome card in accordance with an instant messaging protocol,
the method being characterized in that the welcome card is generated by a server depending on an identifier of the called terminal and an identifier of the calling terminal, and in that it comprises at least one item of information relating to the reachability of the called terminal, the welcome card furthermore being configured so as to make it possible to trigger communication using a mode different from the first mode.

Thus, when a call is not able to succeed, a terminal is able to receive a welcome card, that is to say a message containing information about the reachability of the called user, via a connection in accordance with an instant messaging protocol. Such a message may for example provide one or more contact addresses for the correspondent, or else invite the user to reach the correspondent using another mode and/or at another time. The welcome card comprises means for directly establishing communication using an alternative mode. Such means are for example an identifier of the correspondent on a social network, an email address, or else an instant messaging identifier.

Such a welcome card may in particular invite the user to send a voice message to the unreachable correspondent by way of an instant messaging protocol, such as for example a protocol in accordance with the RCS standard. A destination address associated with the called terminal or with the user of the called terminal is contained in the received welcome card.

According to yet another aspect, and in a manner corresponding to the management method, what is proposed is a device for managing communication between a calling terminal and a called terminal in the event that it is impossible to reach a called terminal using a first mode, the device comprising:
- a communication module designed to receive a message comprising an address of the called terminal and an indication according to which the communication is not able to be established,
- an obtainment module, designed to obtain a welcome card comprising at least one item of information relating to the reachability of the user of the called terminal based on the identifiers associated with the calling terminal and with the called terminal,
- a communication module designed to transmit the obtained welcome card to the calling terminal, the response message being configured so as to make it possible to trigger communication using a mode different from the first mode.

The invention also relates to a notification server comprising a device for managing communication as described above.

According to yet another aspect, and in a manner corresponding to the method for receiving a welcome card, what is proposed is a device for receiving a welcome card in the event that it is impossible to reach a called terminal using a first mode, the method comprising the following steps:
- transmitting a message for establishing communication to the called terminal using the first mode,
- receiving a welcome card via a connection in accordance with an instant messaging protocol,
the device being such that the welcome card is generated by a server depending on an identifier of the called terminal and an identifier of the device, and in that it comprises at least one item of information relating to the reachability of the called terminal, the welcome card furthermore being configured so as to make it possible to trigger communication using a mode different from the first mode.

The invention also relates to a communication terminal comprising a device as described above.

The devices, servers and terminals have advantages analogous to those of the methods to which they correspond.

In one particular embodiment, the various steps of the notification and reception methods are determined by computer program instructions.

The invention therefore also targets a computer program containing instructions designed to implement the steps of a method for managing communication as described above and/or of a method for receiving a welcome card as described above when the program is executed by a processor.

This program may use any programming language and be in the form of source code, object code or intermediate code between source code and object code, such as in a partially compiled form, or in any other desirable form.

The invention also targets a computer-readable recording medium on which there is recorded a computer program comprising instructions for executing the steps of the method for managing communication and/or for receiving a welcome card.

The information medium may be any entity or device capable of storing the program. For example, the medium may comprise a storage means, such as a ROM, for example a CD-ROM or a microelectronic circuit ROM, a flash memory, or else a magnetic recording means, such as for example a hard disk.

The information medium may furthermore be a transmissible medium such as an electrical or optical signal, which may be routed via an electrical or optical cable, by radio or by other means. The program according to the invention may in particular be downloaded from an Internet network.

As an alternative, the information medium may be an integrated circuit into which the program is incorporated, the circuit being designed to execute or to be used in the execution of the method in question.

The various abovementioned embodiments or implementation features may be added, independently or in combination with one another, to the steps of the notification and/or reception methods.

BRIEF DESCRIPTION OF THE FIGURES

Other features and advantages will become apparent upon reading preferred embodiments that are described with reference to the appended drawings, in which.

DETAILED DESCRIPTION OF THE INVENTION

Figure 1:
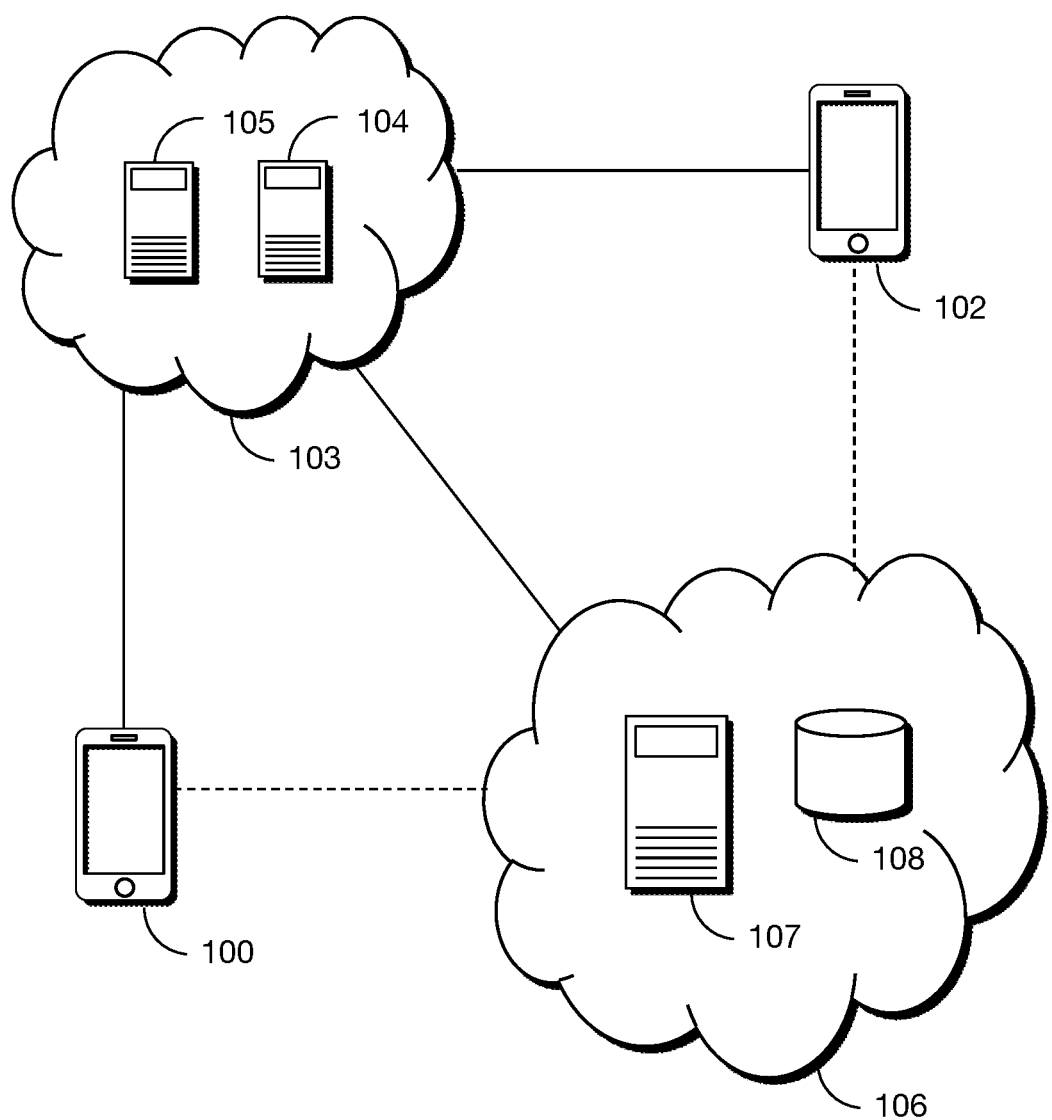
FIG. 1 illustrates an architecture suitable for implementing the invention according to a first particular embodiment.

FIG. 1 shows a first terminal 100, for example a smartphone, connected to a mobile communication network 103 such as a GSM (Global System for Mobile communication) network. The communication network 103 allows the terminal 100 to establish voice communications with the terminal 102 in a conventional manner. The terminal 102 is for example a smartphone terminal.

The terminal 100 and the terminal 102 are respectively associated with a first and with a second call identifier. The call identifier of a terminal may be configured in a SIM card that is inserted into the terminal. It is for example an MSISDN number (the MSISDN or Mobile Station ISDN Number), that is to say a public identifier allowing the terminals to be contacted.

The telecommunication network 103 furthermore comprises a voicemail system 104 designed to manage voicemail inboxes associated with the users of the communication network. For example, the call identifier of the terminal 102 is associated with a voicemail inbox in the messaging system 104. Thus, when for example the user of the terminal 102 is not reachable, the call is redirected to the voice server 104, which invites the caller to leave a message for the attention of the user of the terminal 102. The user of the terminal 102 may consult voice messages left for his attention on the voice server 104.

The network 103 also comprises a call management equipment 105, such as for example an MSC (Mobile services Switching Center). This equipment may correspond to one or more servers of the network 103, and makes it possible in particular to redirect a call to the messaging service 104 when a correspondent is not reachable. If the network 103 supports smart network services of CAMEL phase 1, 2 or 3 type, the server 105 may be an SCP (Service Control Function) server designed to communicate with an MSC by way of an SSF (Service Switching Function) server. An SCP may apply processing operations and return an action to be performed to the SSF, such as for example actions "Continue", "Release", or "Connect" to a specific number or a voice server, possibly with the subscription to call status notifications. The SSF may apply processing operations in the MSC, the MSC continuing to process the call depending on the orders that have been given. An SCP or an MSC modified according to the invention thus makes it possible to exchange messages suitable for implementing the method with the server 107.

FIG. 1 also shows a second telecommunication network 106. Such a network is for example an IMS network implementing communication services in accordance with the RCS (Rich Communication Suite) standard. The telecommunication network 106 comprises a server 107, such as an application server (AS) and a database 108.

In the architecture of FIG. 1, the terminals 100 and 102 are also connected to the IMS network 106. For example, the terminal 102 may be connected to the network 103 by way of a cellular access network and to the network 106 by way of a Wi-Fi access point.

The networks 103 and 106 are interconnected by way of a gateway equipment, such as a GMSC (Gateway MSC) or a GGSN (gateway GPRS support node), such that the servers 105 and 107 are able to exchange messages.

The networks 103 and 106 may however also correspond to a single IMS network.

The network 106 allows the terminals to establish data connections with other terminals or equipments, and in particular to establish communications in accordance with an instant messaging protocol as defined in the RCS standard.

The RCS standard specifically makes it possible to establish instant messaging communications during which correspondents are able to exchange text messages that may contain multimedia files and interaction elements, in order for example to trigger actions. For example, "rich card" RCS messages may contain "suggested action" elements. Such elements may be rendered by terminals in various ways, for example in the form of buttons or clickable links.

The invention is however not limited to such an architecture. In particular, the network 103 may be a fixed telephony network or an IMS communication network. The identifiers of the terminals may then be numbers in accordance with the ITU E.164 standard or SIP URIs (Universal Resource Identifiers). In particular, in some particular embodiments, the networks 103 and 106 may be just a single network, or the distribution of the equipments and of the functions described below between the networks 103 and 106 may vary.

Such an architecture allows the server 105 to transmit a message to the server 107 in the event that it is impossible to establish communication. The message transmitted by the server 105 comprises at least an identifier of the terminal 100, an identifier of the terminal 102 and an indication according to which a call is not able to be established. Upon receiving this message, the server 107 may consult a database 108 in which records are stored. The records in the database 108 make it possible to associate a particular welcome card with the public identity of the terminal 102. Thus, upon receiving the message indicating failure to establish the communication, the server 107 may select a particular welcome card and transfer it to the terminal 100 in accordance with an instant messaging protocol. When a welcome card has been able to be selected from the database 108, a message configured so as to end the communication initiated by the terminal 100 is sent to the server 105 by the server 107. The communication is thus not redirected to the voicemail system 104. Instead, the terminal 100 receives a welcome card through instant messaging.

The various steps of the method for managing communication will now be described with reference to FIGS. 2 and 4.

Figure 4:
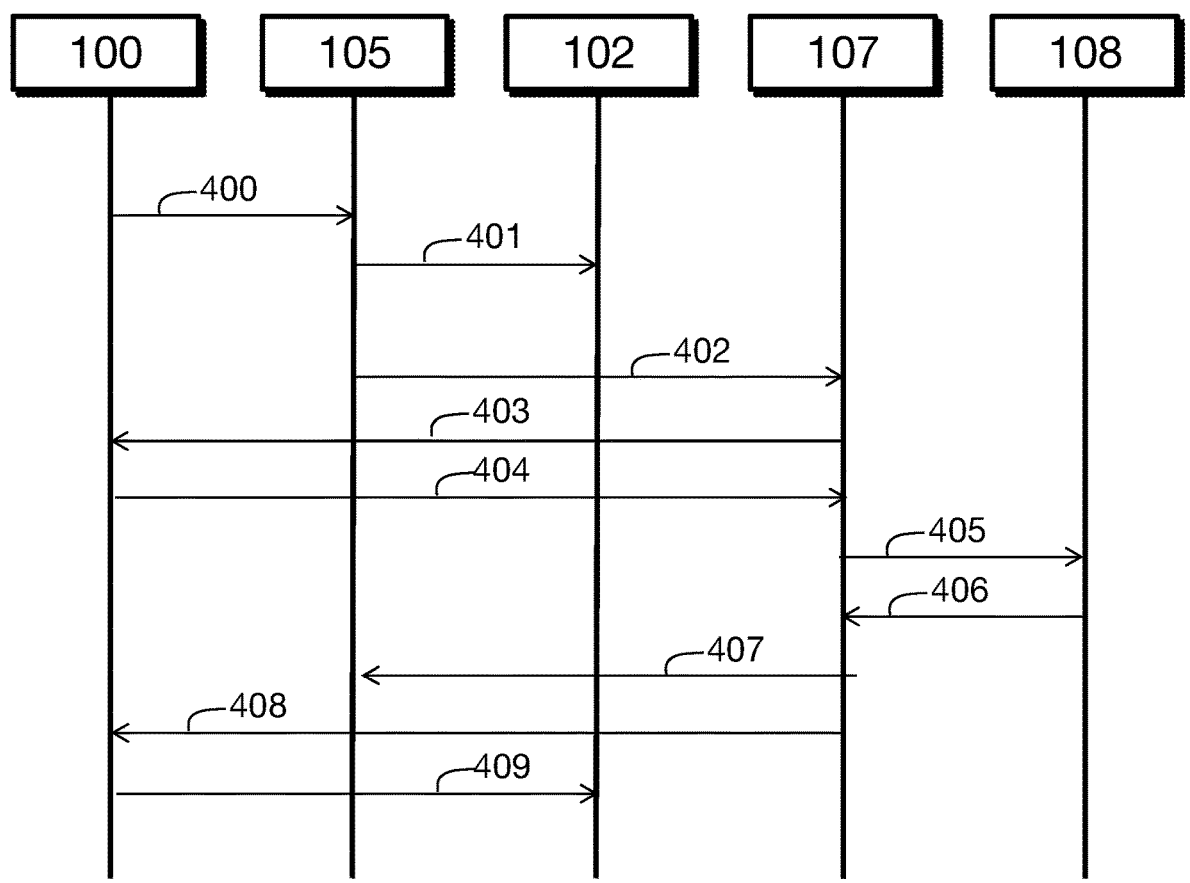
FIG. 4 is a flowchart showing messages exchanged between various entities in order to implement the method for managing communication and the reception method, according to one particular embodiment.

FIG. 4 shows signaling messages exchanged between the various terminals and equipments described with reference to FIG. 1.

Following an action by the user, the terminal 100 sends a first call establishment message 400 to the terminal 102. The message 400 transits via the server 105, which determines the reachability of the recipient terminal. To this end, it interrogates the HLR (Home Location Register, not shown in the figure) of the mobile network 103 in order to locate the terminal 102 in the network. The HLR of the mobile network 103 contains information about the users, and in particular the public identifier of the subscriber terminals of the network and their location.

When the terminal 102 has been able to be located, it relays the call establishment message 401 to the terminal 102, thus causing the call to be displayed on the terminal 102.

The call establishment message (400, 401) in particular comprises the identifier of the called terminal and the identifier of the calling terminal.

The prior art makes provision, when the user of the terminal 102 does not accept the call, to stop displaying the call when a predetermined period has expired. The call is then generally redirected to voicemail associated with an identifier of the terminal 102. Likewise, when the terminal 102 is not reachable, the call is also redirected to the voicemail of the recipient.

According to the invention, it is possible for the call not to be redirected to voicemail in the event of a lack of response from the recipient, or when the terminal 102 is not reachable. Instead, a message 402 comprising an identifier associated with the calling terminal 100 and an identifier associated with the called terminal 102, along with an indication according to which the communication is not able to be established, is transmitted to the server 107 of the communication network 106. According to one particular embodiment, the message furthermore comprises an item of data relating to the reason why the call was not able to be established with the terminal 102. The reason may be that the recipient has not responded to the call, that he has rejected the call, or else that the terminal is not reachable.

When the networks 103 and 106 are separate, the message transits via a gateway equipment by way of which the networks 103 and 106 are interconnected.

Figure 2:
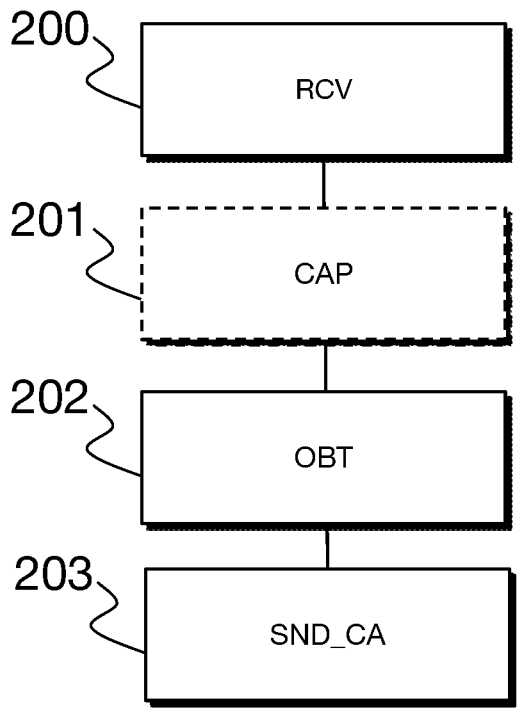
FIG. 2 illustrates the main steps of the method for managing communication according to one particular embodiment.

In a first step 200 shown in FIG. 2, the server 107 receives a message 402 comprising at least an identifier associated with the calling terminal 100, an identifier associated with the called terminal 102 and an indication according to which the communication is not able to be established. The terminal identifiers contained in such a message may be public identifiers, such as for example MSISDNs or R.164 numbers associated with the terminals, or else terminal identifiers, such as an IMEI. The indication according to which communication is not able to be established may be supplemented by an item of data relating to a reason why the communication was not able to be established.

According to one particular embodiment, the message 402 is a message in accordance with the SIP protocol whose "from" and "to" fields comprise identifiers associated with the terminals, the message furthermore comprising an error code relating to the reason why the call was not able to succeed. For example, the message may contain a "408 Request Timeout" or "480 Temporarily Unavailable", "487 Request Terminated" or else "486 Busy Here" code.

Upon receiving the message 402 and optionally, the application server 107 triggers a procedure of discovering the communication capabilities of the terminal 100 in a step 201. The communication capabilities of a terminal comprise for example coding formats or communication protocols that are supported. Such a discovery procedure may be implemented by sending a SIP OPTIONS message (403) to the terminal 102 in order to discover the communication modes supported by the terminal, and in particular in order to determine whether the terminal 100 supports an instant messaging protocol in accordance with the RCS standard.

In accordance with the SIP protocol, the terminal 100 responds to the discovery message 403 with a SIP 200 OK message 404. The message 404 comprises a description of the communication capabilities of the terminal. Such a description may be transmitted in the form of a "feature tag" in a SIP header of the message 404 or in part of the message 404 in accordance with the SDP (Session Description Protocol) standard, as defined in document IETF RFC 4566, and may comprise communication protocols and coding formats that are supported by the terminal.

The server 107 obtains the address of the terminal 100 to which to send the capability discovery message from the message 402 received in step 200.

The address is obtained by consulting a database in which public terminal identifiers are associated with contact addresses. This is for example an HSS (Home Subscriber Server) of the network 106. The HSS comprises records of the various terminals of the network, the list of the users and the rights and authorizations associated therewith, as well as current call sessions. The server 107 may thus obtain an address for contacting the terminal 100 in accordance with an instant messaging protocol in accordance with the RCS standard.

In a step 202, the server 107 obtains a welcome card configured beforehand by the user of the terminal 102.

According to one particular embodiment, the welcome card is obtained by selecting a particular message from a database 108 in which welcome cards configured by users are stored. To this end, the server 107 may for example send an SQL (Simple Query Language) or XCAP request 405 to the database 108, and obtain a welcome card in response 406. A welcome card is selected at least depending on a public identifier of the called party. The database 108 thus makes it possible to associate a public identifier of a called terminal with a welcome card. According to one particular embodiment, the welcome card is also associated with a calling terminal public identifier. Such a provision allows the server 107 to select a different welcome card depending on the caller, or depending on a group of callers.

The database 108 may be an online address book of the terminal 102. The user of the terminal 102 is thus able to configure a tailored welcome card for each contact in his address book, or just for some contacts, or else for a group of particular contacts. The user of the terminal 102 may thus associate a particular welcome card for business contacts and another type of welcome card for personal contacts.

According to one particular embodiment, when no welcome card has been able to be selected, for example because the user of the terminal 102 has not configured a welcome card, a default card may be generated by the server 107. The default message may be generated based on information contained in the HSS, in particular based on information about other terminals associated with the user. Alternative communication means may thus be determined automatically by the server 107 and indicated in the welcome card. The default message may be generated based on usage statistics regarding the communication habits of the user of the terminal 102. For example, the server may consult the frequency and/or the times of the calls, the call reject rate depending on a schedule, or else the average time after which the user of the terminal 102 calls a correspondent back following a missed call in order to generate a response containing an indication about the best time to reach the correspondent.

According to one particular embodiment, when no welcome card has been able to be selected or when no alternative communication mode has been able to be determined at the end of step 201, a message is sent in response to the message 402 received in step 200. This response message is designed to trigger redirection of the call to a conventional voicemail system, such that the caller is able to leave a voice message for the attention of the called party. For this purpose, the message sent in response to the message 402 comprises information suitable for identifying the communication to be redirected, such as for example a caller identifier/called party identifier pair. For example, when the network 103 is a 2G/3G circuit-switched network, the message may comprise a "Release" command in order to end the call. In the case of an IMS network, this may be a SIP CANCEL message.

When a welcome card is selected from the database, a message 407 containing an indication suitable for ending the voice call attempt initiated by the terminal 100. The server 107 is thus able to command the server 105 to end the communication initiated by the terminal 100. In this way, the communication is not redirected to voicemail 104. For this purpose, the message 407 may comprise data able to identify the communication to be ended and an instruction to end said communication. The communication may be identified in the message 407 by a caller identifier/called party identifier pair, or directly by an identifier of the communication obtained beforehand, for example in the message 402 transmitted by the server 105.

In a step 203, the server 107 sends the selected card to the terminal 100. The message may be sent in accordance with an instant messaging protocol, for example by way of a SIP MESSAGE message (408) or of a connection in accordance with the MSRP (Message Session Relay Protocol) standard, as defined by the IETF in document RCF 4975.

According to one particular embodiment of the invention, the selected welcome card comprises at least one item of information relating to the reachability of the terminal or of the user of the terminal. Such information relating to the reachability of the called terminal is for example schedules that are preconfigured or obtained from a diary of the user, alternative contact means such as an email address or an address on a social network, or the public identifier of one or more other terminals. The reachability information may also comprise location data of the called terminal or of the calling terminal, a movement speed, or else a presence status. Such a provision makes it possible to provide the caller with information that makes it possible to increase the chances of getting in contact with the caller and limiting unsuccessful call attempts, which represent a needless burden for the network.

The welcome card may also comprise an indication about a mode of interaction preferred by the called user. For example, it may comprise an indication according to which the correspondent wishes to be contacted using a particular mode.

According to one particular embodiment, the reachability information contained in the welcome card is associated with at least one validity criterion. The content displayed based on the welcome card thus depends on the time at which it is consulted. For this purpose, the message may comprise instructions for making the display of certain data conditional on a date and the time or else a location of the terminal. The validity information may be obtained for example from a diary of the called user, by way of a dedicated request to an online diary server.

The welcome card may furthermore contain multimedia components, such as for example images, a video clip or an audio document configured by the user with whom the welcome card is associated and general information regarding the called party, such as for example opening times, institutional information, a postal address, or business propositions of a shop when the terminal 102 is for example associated with a line of a professional.

The message may also comprise interaction elements configured so as to allow the user of the terminal 100 to trigger actions directly based on the message. The message in particular comprises an interaction element making it possible to trigger communication to the terminal 102 or an alternative address provided in the welcome card, using a mode that may be different from the first mode. Thus, by consulting the received welcome card, a user of the terminal 100 is able, through a simple action on an interface element defined by the content of the message, such as for example an interface element defined by a "suggested action" element contained in a "rich card" RCS, to trigger communication with a user of the terminal 102 in a communication mode different from the unsuccessful voice communication mode. For example, the action on the interface element may trigger sending of an email, of an SMS or of an instant message, or make it possible to get in contact via a social network or a particular communication application, or else to establish voice communication with another terminal associated with the user.

The message may also contain an interaction element configured so as to allow the user of the terminal 100 to record a voice message on his terminal and transmit the recorded message to a user of the terminal 102 by way of a message 409 in accordance with an instant messaging protocol, an email or a social network. In contrast to the prior art, the message is recorded and encoded locally on the terminal from an audio acquisition device of the terminal. It is thus possible to offer an ergonomic interface that allows efficient and high-quality recording of the message. As the message is sent by way of an instant messaging system, it will be delivered immediately to the correspondent as soon as the terminal is reachable.

For this purpose, the welcome card may for example be in the HTML (Hypertext Markup Language) format or in the XML format.

Figure 3:
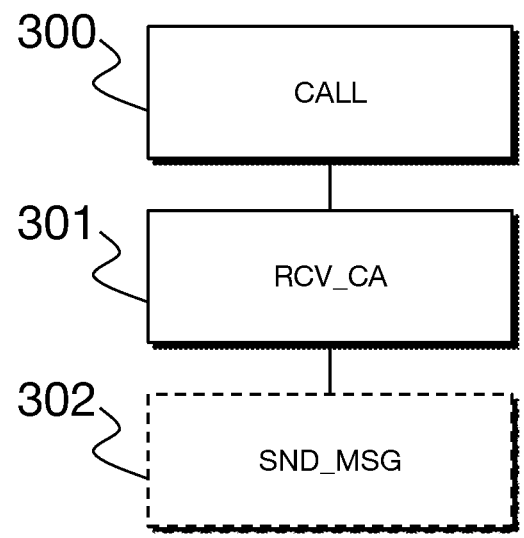
FIG. 3 illustrates the main steps of the method for receiving a welcome card according to one particular embodiment.

FIG. 3 illustrates the main steps of the method for reception of a welcome card by the terminal 100.

In a first step 300, the terminal sends a message for establishing voice communication to the terminal 102. The message for establishing voice communication is a message suitable for the telecommunication network 103.

In step 301, the terminal receives a welcome card generated by a server depending on an identifier of the terminal 102 and an identifier of the terminal 100. The received welcome card is such that it comprises at least one item of information relating to the reachability of the called terminal, the welcome card furthermore being configured so as to make it possible to trigger communication using a mode different from the first mode. The features of the welcome card received by the terminal 100 in step 301 are identical to the features of the welcome card transmitted by the server 107 in step 203, and will not be described again with reference to the reception method.

In step 302, a user of the terminal 100 may optionally use one of the interaction means proposed by the welcome card in order to send a message to a user of the terminal 102, for example a voice message 409 transmitted by way of an instant messaging protocol, an email or a social network.

Figure 5:
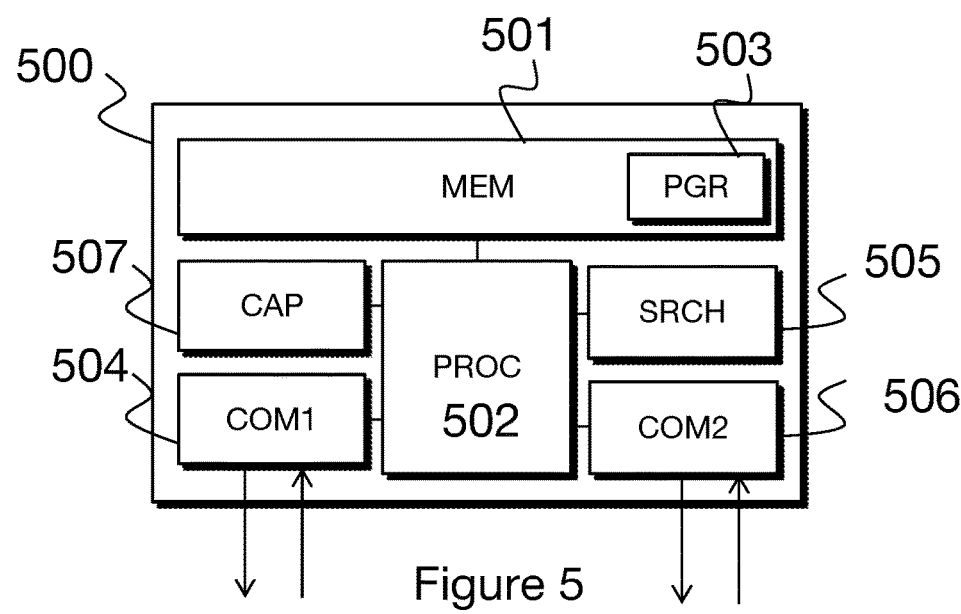
FIG. 5 shows the architecture of a device for managing communication according to one particular embodiment, in simplified form.

FIG. 5 illustrates a device 500 implementing the method for managing communication according to one particular embodiment of the invention. The device comprises a storage space 501, for example a memory MEM, and a processing unit 502 equipped for example with a processor PROC. The processing unit may be managed by a program 503, for example a computer program PGR, implementing the method for managing communication as described in the invention with reference to FIGS. 2 and 4, and in particular the steps of receiving a message comprising an identifier associated with the called terminal and an indication according to which the communication is not able to be established, of obtaining a welcome card comprising at least one item of information relating to the reachability of the user of the called terminal based on the identifiers associated with the calling terminal and with the called terminal, and of transmitting the obtained welcome card to the calling terminal via a connection in accordance with an instant messaging protocol, the welcome card being configured so as to make it possible to trigger communication using a mode different from the first mode.

On initialization, the instructions of the computer program 503 (PGR) are for example loaded into a memory RAM (random access memory) before being executed by the processor of the processing unit 502. The instructions of the program may also be stored on a storage medium such as a flash memory, a hard disk or any other non-transitory storage medium. The processor of the processing unit 502 implements the steps of the method for managing communication between a calling terminal and a called terminal according to the instructions of the computer program 503.

For this purpose, the device 500 comprises a communication module 504 (COM1) designed to receive a message comprising an address of a called terminal and an indication according to which communication is not able to be established with the called terminal. The communication device 504 may be for example a network card, such as for example an Ethernet card, designed to receive messages from a server.

The device also comprises an obtainment module 505 (SRCH), designed to obtain a welcome card comprising at least one item of information relating to the reachability of the user of the called terminal based on the identifiers associated with the calling terminal and with the called terminal. Such an obtainment module may be implemented by a processor and a memory in which there are stored instructions designed to send an SQL request to a database in which welcome cards are stored in association with public terminal identifiers, and receive, in response, a welcome card selected depending on criteria such as the public identifier of a called terminal.

The device also comprises a communication module 506 (COM2) designed to transmit the obtained welcome card to the calling terminal, the welcome card being configured so as to make it possible to trigger communication using a mode different from the first mode. Such a communication module may correspond to a network interface of the server, for example an Ethernet network card associated with a SIP protocol stack.

Lastly, according to one particular embodiment, the device 500 comprises a module 507 (CAP) for obtaining the capabilities of a calling terminal. Such a module may be implemented by a processor and a memory comprising instructions that, when they are executed by the processor, command the sending of a SIP OPTION message to the calling terminal in order to obtain a set of communication capabilities in response.

Such a device may advantageously be integrated into an application server of an IMS network, such as the server 107.

Figure 6:
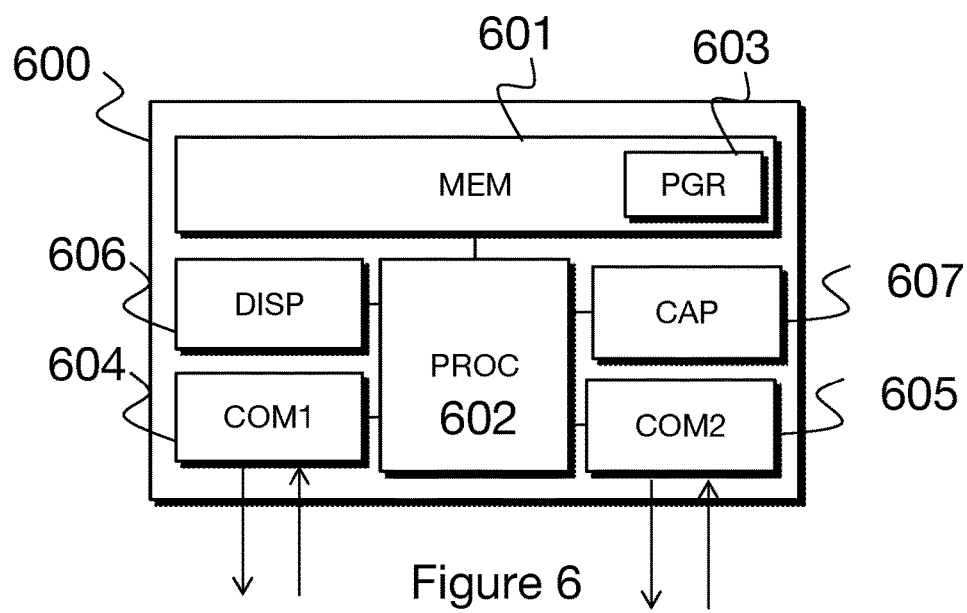
FIG. 6 illustrates the architecture of a device for receiving a welcome card according to one particular embodiment, in simplified form.

FIG. 6 illustrates a device 600 implementing the method for receiving a welcome card according to one particular embodiment of the invention. The device comprises a storage space 601, for example a memory MEM, and a processing unit 602 equipped for example with a processor PROC. The processing unit may be managed by a program 603, for example a computer program PGR, implementing the method for receiving a welcome card as described in the invention with reference to FIG. 3, and in particular the steps of transmitting a message for establishing communication to the called terminal using the first mode via an instant messaging protocol, and of receiving a welcome card generated by a server depending on an identifier of a called terminal and an identifier of a calling terminal comprising at least one item of information relating to the reachability of the called terminal, and configured so as to make it possible to trigger communication using a mode different from the first mode.

On initialization, the instructions of the computer program 603 (PGR) are for example loaded into a memory RAM (random access memory) before being executed by the processor of the processing unit 602. The instructions of the program may also be stored on a storage medium such as a flash memory, a hard disk or any other non-transitory storage medium. The processor of the processing unit 602 implements the steps of the method for receiving a welcome card according to the instructions of the computer program 603.

For this purpose, the device 600 comprises, besides the memory 601 and the processing unit 602, a communication module 604, such as for example a cellular network interface, such as a GSM, 2G, 3G or 4G or else Wi-Fi interface. The communication module 604 is furthermore designed to send a message for establishing voice communication to a terminal.

The device 600 also comprises a communication module 605 (COM2) designed to receive a welcome card in response to unsuccessful voice communication. The communication module 605 is for example a cellular network interface, such as a GSM, 2G, 3G or 4G interface or else a Wi-Fi interface. The communication modules 604 and 605 may be combined to form a single communication module.

The device 600 also comprises an audio acquisition module 607 designed to capture an audio signal, encode it and transmit it to a server.

Lastly, the device 600 comprises a display module 606, designed to display a welcome card as described above.

Such a device may be integrated into a communication terminal, such as for example into a smartphone mobile telephone, a connected watch, a tablet or else a personal computer.

The invention claimed is:

1. A method for managing communication over a communication network between a calling terminal and a called terminal in the event that it is impossible to reach the called terminal in an attempt to establish communication using a first mode, the method comprising the following acts performed by a communication server:
    receiving a message comprising an identifier associated with the called terminal and an indication according to which the communication is not able to be established,
    obtaining a welcome card comprising at least one item of information relating to reachability of a user of the called terminal based on identifiers associated with the calling terminal and with the called terminal, the at least one item of information comprising at least one alternative communication identifier associated with the user of the called terminal, which is selected and inserted into the welcome card by the communication server according to reachability criteria of the called terminal, and
    transmitting the obtained welcome card as a response message to the calling terminal in accordance with an instant messaging protocol, the response message being configured so as to make it possible to trigger communication using a mode different from the first mode.

2. The method as claimed in claim 1, wherein the welcome card comprises an interaction element designed to trigger a recording of a voice message by the calling terminal and sending the recorded message by way of an instant messaging protocol.

3. The method as claimed in claim 1, wherein the welcome card is furthermore generated from an address book associated with the called terminal.

4. The method as claimed in claim 1, such that the method furthermore comprises, when a welcome card has been obtained, an act of transmitting, in response to the message comprising an indication according to which the communication is not able to be established, a message designed to cancel the attempt to establish communication without redirection to voicemail.

5. The method as claimed in claim 1, wherein the welcome card is such that the information relating to the reachability of the called user is associated with at least one element selected from among the elements contained in the following list:
    a schedule, location data of the first terminal and/or of the second terminal,
a movement speed,
a presence status,
a validity criterion.

6. The method as claimed in claim 1, furthermore comprising an act of obtaining communication capabilities of the calling terminal, the welcome card being transmitted using a communication technology compatible with the calling terminal.

7. A method for reception of a welcome card by a calling terminal in the event that it is impossible to reach a called terminal using a first mode, the method comprising the following acts:
transmitting a message on a communication network for establishing communication to the called terminal using the first mode,
receiving a welcome card in accordance with an instant messaging protocol,
wherein the welcome card is generated by a server depending on an identifier of the called terminal and an identifier of the calling terminal, and the welcome card comprises at least one item of information relating to reachability of the called terminal, the at least one item of information comprising at least one alternative communication identifier associated with a user of the called terminal, which is selected and inserted into the welcome card by the server according to reachability criteria of the called terminal, the welcome card furthermore being configured so as to make it possible to trigger communication using a mode different from the first mode.

8. A device for managing communication between a calling terminal and a called terminal in the event that it is impossible to reach the called terminal using a first mode, the device comprising:
at least one processor; and
at least one non-transitory computer-readable medium comprising instructions stored thereon which when executed by the at least one processor configure the device to perform acts comprising:
receiving a message comprising an address of the called terminal and an indication according to which the communication is not able to be established,
obtaining a welcome card comprising at least one item of information relating to reachability of a user of the called terminal based on identifiers associated with the calling terminal and with the called terminal, the at least one item of information comprising at least one alternative communication identifier associated with the user of the called terminal, which is selected and inserted into the welcome card by the device according to reachability criteria of the called terminal, and
transmitting the obtained welcome card to the calling terminal in accordance with an instant messaging protocol, the welcome card being configured so as to make it possible to trigger communication using a mode different from the first mode.

9. A notification server comprising the device for managing communication as claimed in claim 8.

10. A device for reception of a welcome card by a calling terminal in the event that it is impossible to reach a called terminal using a first mode, the device comprising:
at least one processor; and
at least one non-transitory computer-readable medium comprising instructions stored thereon which when executed by the at least one processor configure the device to:
transmit a message for establishing communication to the called terminal using the first mode,
receive a welcome card in accordance with an instant messaging protocol, wherein the welcome card is generated by a server depending on an identifier of the called terminal and an identifier of the calling terminal, and the welcome card comprises at least one item of information relating to reachability of the called terminal, the at least one item of information comprising at least one alternative communication identifier associated with a user of the called terminal, which is selected and inserted into the welcome card by the server according to reachability criteria of the called terminal, the welcome card furthermore being configured so as to make it possible to trigger communication using a mode different from the first mode.

11. The device as claimed in claim 10, wherein the device is comprised by the calling terminal.

12. A non-transitory computer-readable recording medium on which there is recorded a computer program comprising instructions for executing a method when the instructions are executed by a processor of a communications server, the method being managing communication over a communication network between a calling terminal and a called terminal in the event that it is impossible to reach the called terminal in an attempt to establish communication using a first mode, wherein the instructions configure the communication server to:
receive a message comprising an identifier associated with the called terminal and an indication according to which the communication is not able to be established,
obtain a welcome card comprising at least one item of information relating to reachability of a user of the called terminal based on identifiers associated with the calling terminal and with the called terminal, the at least one item of information comprising at least one alternative communication identifier associated with the user of the called terminal, which is selected and inserted into the welcome card by the communication server according to reachability criteria of the called terminal, and
transmit the obtained welcome card as a response message to the calling terminal in accordance with an instant messaging protocol, the response message being configured so as to make it possible to trigger communication using a mode different from the first mode.

* * * * *